(12) United States Patent
Gigioli et al.

(10) Patent No.: US 8,514,900 B2
(45) Date of Patent: Aug. 20, 2013

(54) OPTICAL FREQUENCY STABILIZATION SYSTEM AND METHOD

(75) Inventors: George Gigioli, Brookeville, MD (US); Edward Y. Luzhansky, Ellicott, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 416 days.

(21) Appl. No.: 12/833,424

(22) Filed: Jul. 9, 2010

(65) Prior Publication Data
US 2012/0008652 A1    Jan. 12, 2012

(51) Int. Cl.
*H01S 3/13*    (2006.01)
(52) U.S. Cl.
USPC .............. 372/32; 372/29.02; 372/38.01
(58) Field of Classification Search
USPC ...................... 372/32, 29.02, 38.01
See application file for complete search history.

(56) References Cited

U.S. PATENT DOCUMENTS

| | | | |
|---|---|---|---|
| 5,134,622 A * | 7/1992 | Deacon ............................ 372/21 |
| 7,315,697 B2 | 1/2008 | Smilanski et al. |
| 7,767,480 B1 * | 8/2010 | Pickrell et al. .................. 438/37 |
| 2005/0068541 A1 | 3/2005 | Gunning et al. |
| 2005/0175046 A1 * | 8/2005 | Khazaei et al. ............. 372/29.02 |
| 2006/0192970 A1 * | 8/2006 | Tiemann ....................... 356/454 |
| 2008/0055702 A1 | 3/2008 | Ferrari |
| 2009/0322971 A1 * | 12/2009 | Dorjgotov et al. ................ 349/5 |

* cited by examiner

*Primary Examiner* — Kinam Park
(74) *Attorney, Agent, or Firm* — Tarolli, Sundheim, Covell & Tummino LLP

(57) ABSTRACT

One embodiment of the invention includes an optical system. The optical system includes an optical cavity comprising a plurality of reflectors. The optical system also includes optics configured to provide a first optical signal and a second optical signal into respective inputs of the optical cavity to be substantially concurrently resonated within the optical cavity. The first and second optical signals can have distinct wavelengths.

22 Claims, 3 Drawing Sheets

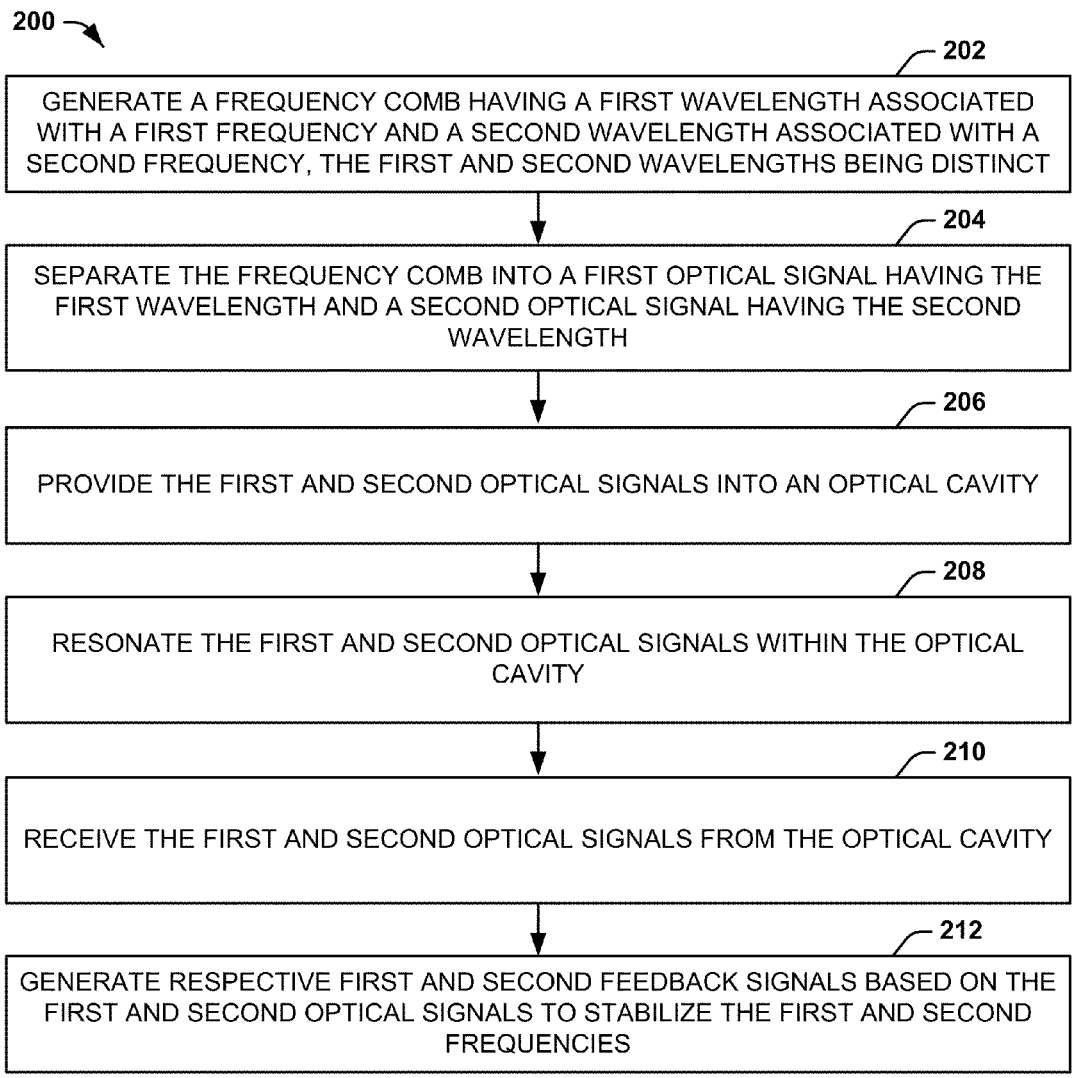

OPTICAL FREQUENCY STABILIZATION SYSTEM AND METHOD

TECHNICAL FIELD

The present invention relates generally to optical systems, and specifically to an optical frequency stabilization system and method.

BACKGROUND

Optical signals can be used for a variety of implementations, such as communications, imaging, and applications that require a stable frequency reference. Optical applications typically implement a laser optical source, such as a mode-locked laser, to provide the optical signal that is implemented in the optical application. However, the frequency of the optical signal generated by the optical laser source can drift, such that the frequency can change over time or from one pulse to a next pulse. Thus, many optical systems implement optical frequency stabilization techniques, such as the Pound-Drever-Hall technique, to stabilize the frequency of the optical signal.

SUMMARY

One embodiment of the invention includes an optical system. The optical system includes an optical cavity comprising a plurality of reflectors. The optical system also includes optics configured to provide a first optical signal and a second optical signal into respective inputs of the optical cavity to be substantially concurrently resonated within the optical cavity. The first and second optical signals can have distinct wavelengths.

Another embodiment of the invention includes an optical frequency stabilization system. The system includes a laser configured to generate a frequency comb comprising a plurality of wavelengths and optics configured to separate the frequency comb into a respective plurality of optical signals having the plurality of wavelengths. The system also includes an optical cavity configured to receive the plurality of optical signals from the optics and to resonate the plurality of optical signals within the optical cavity and feedback stabilization components configured to receive the plurality of optical signals output from the optical cavity and to provide a respective plurality of feedback signals to the laser for stabilizing frequencies associated with the plurality of wavelengths.

Another embodiment of the invention includes a method for stabilizing a first frequency and a second frequency. The method includes generating a frequency comb comprising a first wavelength associated with the first frequency and a second wavelength associated with the second frequency, the first and second wavelengths being distinct. The method also includes separating the frequency comb into a first optical signal having the first wavelength and a second optical signal having the second wavelength and providing the first and second optical signals into respective first and second inputs of an optical cavity. The method further includes resonating the first and second optical signals within the optical cavity, receiving the first and second optical signals from the optical cavity, and generating respective first and second feedback signals based on the first and second optical signals to stabilize the first and second frequencies.

BRIEF DESCRIPTION OF THE DRAWINGS

FIG. 4 illustrates an example of a diagram a portion of an optical frequency stabilization system in accordance with an aspect of the invention.

FIG. 5 illustrates an example of a method for stabilizing a first optical signal and a second optical signal in accordance with an aspect of the invention.

DETAILED DESCRIPTION

The present invention relates generally to optical systems, and specifically to an optical frequency stabilization system and method. The optical frequency stabilization system can include a laser, such as a mode-locked laser, configured to generate a frequency comb comprising a set of wavelengths. A set of optics, such as including dichroic beam-splitters, can separate the frequency comb into respective optical signals with the set of wavelengths. The set of wavelengths can all be distinct with respect to each other. The optics can polarize and direct the set of optical signals into an optical cavity that can resonate the set of optical signals within. Feedback stabilization components can receive the set of optical signals output from the optical cavity and can provide a respective set of feedback signals to the laser for stabilizing the frequencies associated with the set of wavelengths.

The optical cavity can include alternating layers of first and second reflectors (e.g., mirrors), such as at opposing ends of the optical cavity, that have different indices of refraction with respect to each other. Each of the first and second mirrors can have an optical thickness that is approximately equal to one quarter of a design wavelength, or to an odd multiple of one quarter of a design wavelength, where the odd multiple is a positive integer. As described herein, the term "design wavelength" can correspond to a longest wavelength of an optical signal within which the optical cavity is intended to resonate. Therefore, the optical cavity can be resonant of an optical signal having the design wavelength and any signals having odd harmonic frequencies with respect to the optical signal of the design wavelength. As a result, the optical cavity can resonate multiple optical signals having odd wavelength ratios concurrently, such that the optical cavity can be implemented by the optical frequency stabilization system to stabilize the multiple optical signals.

Figure 1:
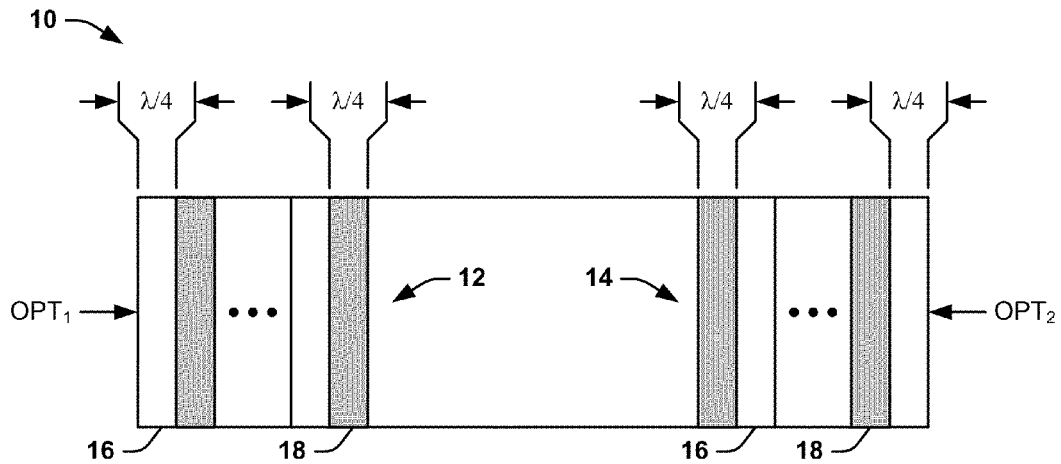
FIG. 1 illustrates an example of an optical cavity in accordance with an aspect of the invention.

FIG. 1 illustrates an example of an optical cavity 10 in accordance with an aspect of the invention. In the example of FIG. 1, the optical cavity 10 is demonstrated as a Fabry-Pérot optical cavity, in that the optical cavity 10 is a plane-parallel optical cavity. However, the optical cavity 10 can be configured as any of a variety of different types of optical cavities. For example, the optical cavity 10 can be configured as a concentric-spherical, confocal, hemispherical, or concave-convex optical cavity.

The optical cavity 10 includes a first reflector 12 and a second reflector 14 (e.g., mirrors), demonstrated in the example of FIG. 1 at each of two ends of the optical cavity 10. Each of the first and second reflectors 12 and 14 includes a plurality of first layers 16 and a plurality of second layers 18 that alternate to collectively form the first and second reflectors 12 and 14. As an example, the first and second reflectors 12 and 14 can include greater than ten of each of the first and second layers 16 and 18. The first and second reflectors 12 and 14 can be composed of fused silica substrates that support the plurality of first and second layers 16 and 18. The first and second layers 16 and 18 can include coatings that are different materials with respect to each other, such that the coating of the first quarter wave plate layers 16 has a different index of refraction relative to the coating of the second quarter wave plate layers 18. For example, the first layers 16 can have a Zirconium Dioxide ($ZrO_2$) coating having a high index of refraction, and the second layers 18 can have a Magnesium Fluoride ($MgF_2$) coating having a low index of refraction. Thus, the alternating layers of the first and second layers 16 and 18 can be highly reflective of certain wavelengths of light, as described in greater detail below.

As opposed to typical optical cavities, in the example of FIG. 1, each of the first and second layers 16 and 18 of the optical cavity 10 has an optical thickness (i.e., physical thickness times refractive index) that is one-quarter of a design wavelength $\lambda$. The design wavelength $\lambda$ can correspond to a longest wavelength of an optical signal within which the optical cavity 10 is intended to resonate. Thus, the first and second layers 16 are highly reflective of optical signals having a wavelength that is approximately equal to the design wavelength $\lambda$, such that the design wavelength $\lambda$ optical signals can resonate within the optical cavity 10. However, the first and second reflectors 12 and 14 can also be highly reflective of optical signals having frequencies that are odd harmonics of an optical signal having the design wavelength $\lambda$.

Figure 2:
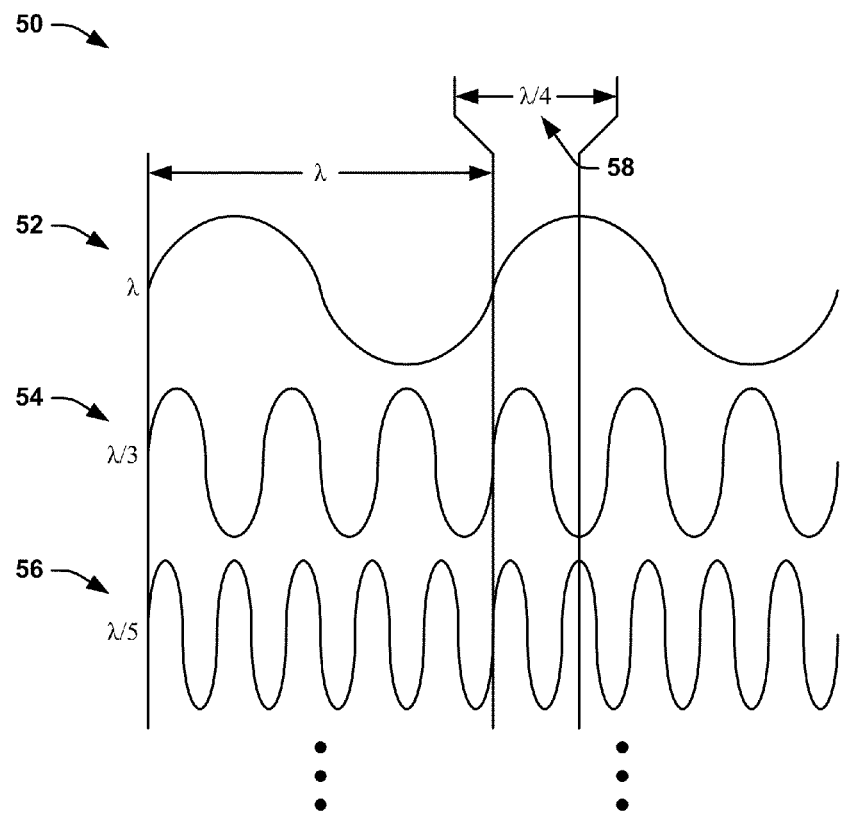
FIG. 2 illustrates an example of a diagram of optical signals in accordance with an aspect of the invention.

FIG. 2 illustrates an example of a diagram 50 of optical signals in accordance with an aspect of the invention. Specifically, the diagram 50 includes a first optical signal 52 having the design wavelength $\lambda$, a second optical signal 54 having a wavelength that is approximately equal to one-third the design wavelength $\lambda$ (i.e., $\lambda/3$), and a third optical signal 56 having a wavelength that is approximately equal to one-fifth the design wavelength $\lambda$ (i.e., $\lambda/5$). Therefore, the second optical signal 54 has a frequency that is a third harmonic of the first optical signal 52 and the third optical signal 56 has a frequency that is a fifth harmonic of the first optical signal 52.

The diagram 50 also demonstrates a length 58 along the optical signals 52, 54, and 56 that is approximately equal to one-quarter of the design wavelength $\lambda$ (i.e., $\lambda/4$). Thus, the length 58 corresponds to a length of the first and second layers 16 and 18 of the first and second reflectors 12 and 14. As demonstrated in the example of FIG. 2, the length 58 spans a beginning of a period of each of the optical signals 52, 54, and 56 and extends to a peak of each of the optical signals 52, 54, and 56. Therefore, based on a combination of the optical thickness of each of the first and second layers 16 and 18 (i.e., the length 58: $\lambda/4$) and the differing refractive indices of the coatings of each of the first and second layers 16 and 18, the reflectors 12 and 14 are highly reflective of each of the optical signals 52, 54, and 56. As a result, the optical cavity 10 can resonate each of the optical signals 52, 54, and 56. Furthermore, as demonstrated in the example of FIG. 2, the length 58 can span a beginning of a period of additional signals having increasing odd harmonics of the frequency of the first signal 52 and extend to a respective peak of the additional odd harmonic signals (e.g., $7^{th}$ harmonic, $9^{th}$ harmonic, etc.). Therefore, the reflectors 12 and 14 can likewise be highly reflective of the additional odd harmonic signals, such that the optical cavity 10 can likewise be resonant of the odd harmonic signals.

Referring back to the example of FIG. 1, because the optical cavity 10 can be resonant of each of the optical signals 52, 54, and 56, as well as additional odd harmonic signals with respect to the design wavelength $\lambda$, the optical cavity 10 can resonate two optical signals concurrently. In the example of FIG. 1, the optical cavity 10 is demonstrated as receiving a first optical signal $OPT_1$ and a second optical signal $OPT_2$ at opposite respective ends of the optical cavity 10. The first and second optical signals $OPT_1$ and $OPT_2$ can be provided from a set of optics (not shown) into the optical cavity 10 and can have distinct wavelengths with respect to each other, such as having odd integer ratios with respect to wavelengths associated with the design wavelength $\lambda$. As an example, the first optical signal $OPT_1$ can have a wavelength that is approximately equal to the design wavelength $\lambda$ and the second optical signal $OPT_2$ can have a wavelength that is associated with a frequency that is an odd harmonic of the first optical signal $OPT_1$ (e.g., $3^{rd}$ harmonic, $5^{th}$ harmonic, etc.). As another example, both the first and second optical signals $OPT_1$ and $OPT_2$ can each have a wavelength that is associated with a frequency that is an odd harmonic of the design wavelength $\lambda$, such that neither of the first and second optical signals $OPT_1$ and $OPT_2$ have the design wavelength $\lambda$.

Furthermore, the first and second optical signals $OPT_1$ and $OPT_2$ can be generated from a frequency comb, such that the frequencies of the first and second optical signals $OPT_1$ and $OPT_2$ span a frequency band that is less than one octave. For example, the first and second optical signals $OPT_1$ and $OPT_2$ can have frequencies that are adjacent odd harmonics of the frequency associated with the design wavelength $\lambda$, such as the $3^{rd}$ and $5^{th}$ harmonics or the $11^{th}$ and $13^{th}$ harmonics. In any example, based on the difference in wavelengths between the first and second optical signals $OPT_1$ and $OPT_2$, and because the distinct wavelengths of both of the first and second optical signals $OPT_1$ and $OPT_2$ can be resonant within the optical cavity 10, the optical cavity 10 can thus resonate both of the optical signals $OPT_1$ and $OPT_2$ concurrently. As a result, an associated frequency stabilization system can implement a single optical cavity, such as the optical cavity 10, to stabilize two or more optical signals. Furthermore, the optics that provide the optical signals $OPT_1$ and $OPT_2$ to the optical cavity 10 need not include non-linear optical components, such as frequency doublers to manipulate the frequencies of the optical signals $OPT_1$ and $OPT_2$, such as subsequent to separating the optical signals $OPT_1$ and $OPT_2$ from an associated frequency comb.

It is to be understood that the optical cavity 10 is not limited to the example of FIG. 1. As an example, the optical cavity 10 is not limited to an elongate optical cavity, but could instead have a variety of shape configurations, such as spherical, to allow resonation of the two or more optical signals having distinct wavelengths with odd integer ratios relative to each other. As another example, the optical thickness of the first and second layers 16 and 18 is not limited to one-quarter of the design wavelength $\lambda$, but could be any positive integer odd multiple of one-quarter of the design wavelength (e.g., $3\lambda/4$, $5\lambda/4$, $7\lambda/4$, etc.). Furthermore, while the optical cavity 10 is demonstrated with a plurality of each of the first and second layers 16 and 18 at each of the reflectors 12 and 14, it is to be understood that the optical cavity 10 could include only a single one of each of the layers 16 and 18 for each of the reflectors 12 and 14. Thus, the optical cavity 10 can be configured in a variety of ways.

Figure 3:
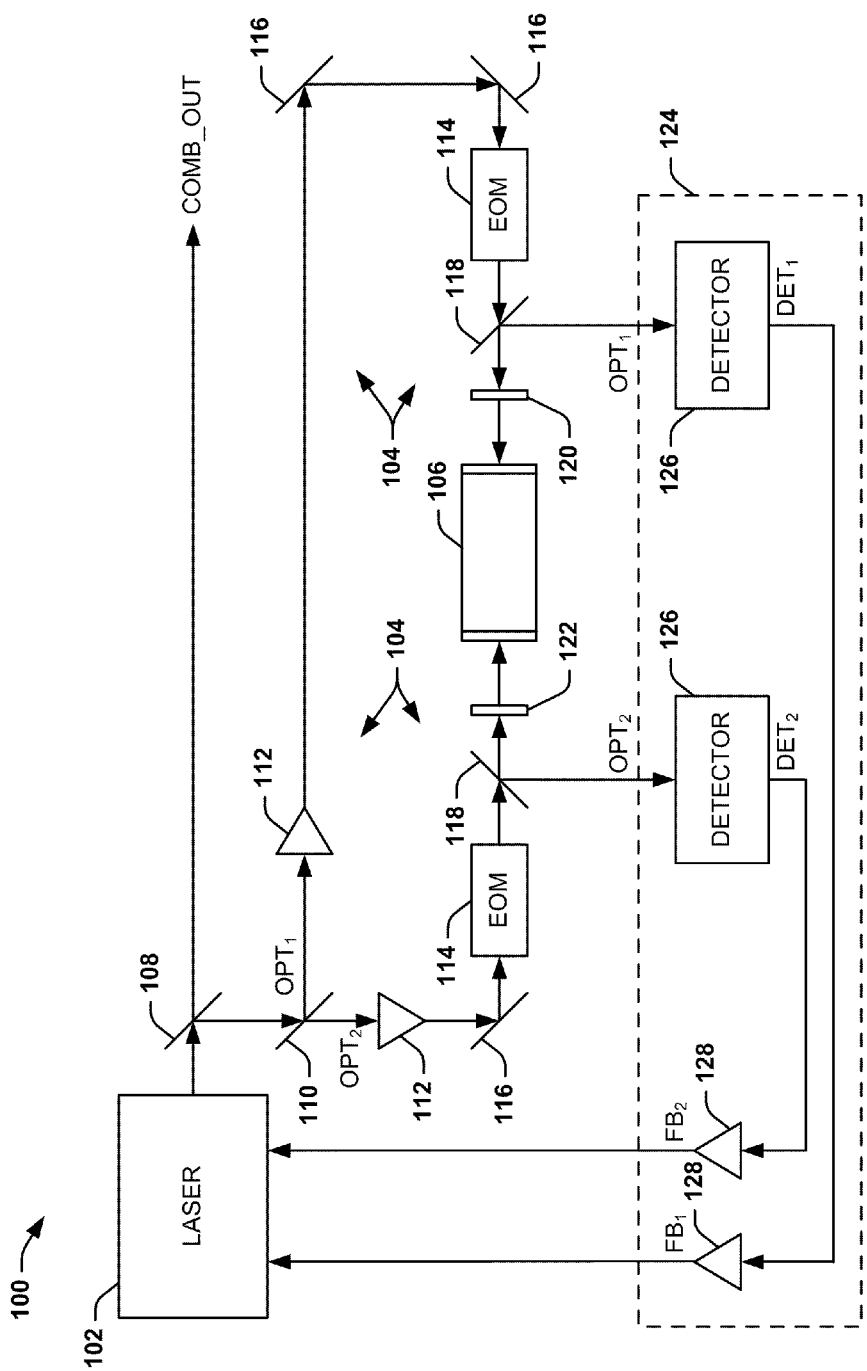
FIG. 3 illustrates an example of an optical frequency stabilization system in accordance with an aspect of the invention.

FIG. 3 illustrates an example of an optical frequency stabilization system 100 in accordance with an aspect of the invention. The optical frequency stabilization system 100 can be implemented in a variety of optical applications that may require a stable optical source. As an example, the optical frequency stabilization system 100 can be implemented in satellite communications, global positioning satellite (GPS) applications, imaging, and a variety of other applications that require a stable frequency reference. The optical frequency stabilization system 100 can implement frequency stabilization techniques that are substantially similar to Pound-Drever-Hall frequency stabilization techniques.

The optical frequency stabilization system 100 includes a laser 102 that generates an optical frequency comb, demonstrated in the example of FIG. 3 by the optical signal COMB_OUT. As an example, the laser 102 can be a mode-locked laser that generates repeated laser pulses across a frequency band that is represented by the frequency comb COMB_OUT. The optical frequency stabilization system 100 is thus configured to stabilize at least two of the frequencies in the frequency comb COMB_OUT. In the example of FIG. 3, as described below, the frequency comb COMB_OUT includes a first optical signal $OPT_1$ and a second optical signal $OPT_2$.

The optical frequency stabilization system 100 also includes a set of optics 104 that are configured to separate a first optical signal $OPT_1$ and a second optical signal $OPT_2$ from the frequency comb COMB_OUT and to direct the first and second optical signals $OPT_1$ and $OPT_2$ into an optical cavity 106. The optical cavity 106 can be configured substantially similar to the optical cavity 10 in the example of FIG. 1. Specifically, the optical cavity 106 can have reflectors, such as at opposing ends, that include alternative layers that include different refractive index coating materials and that each have an optical thickness that is approximately one-quarter of a design wavelength $\lambda$ associated with the optical cavity 106.

The optical signals $OPT_1$ and $OPT_2$ can have respective distinct wavelengths $\lambda_1$ and $\lambda_2$ that have an odd integer ratio with respect to each other. As an example, the first optical signal $OPT_1$ can have a wavelength $\lambda_1$ that is approximately equal to a design wavelength $\lambda$ associated with the optical cavity 106 and the second optical signal $OPT_2$ can have a wavelength $\lambda_2$ that is associated with a frequency that is an odd harmonic of the first optical signal $OPT_1$ (e.g., $3^{rd}$ harmonic, $5^{th}$ harmonic, etc.). As another example, both of the optical signals $OPT_1$ and $OPT_2$ can each have wavelengths $\lambda_1$ and $\lambda_2$ that are associated with frequencies that are odd harmonics of the design wavelength $\lambda$, such that neither of the optical signals $OPT_1$ and $OPT_2$ have the design wavelength $\lambda$. Therefore, both of the optical signals $OPT_1$ and $OPT_2$ can be resonant within the optical cavity 106.

The optics 104 include a partially reflective mirror 108 that acts as a beam-splitter to reflect a portion of the frequency comb COMB_OUT through the remaining portions of the optics 104 to be directed to the optical cavity 106. The frequency comb COMB_OUT is then provided to a dichroic beam-splitter 110 that is configured to reflect light having a first wavelength $\lambda_1$ and to pass light having a second wavelength $\lambda_2$. Therefore, the dichroic beam-splitter 110 reflects the first optical signal $OPT_1$ and passes the second optical signal $OPT_2$, thus separating the optical signals $OPT_1$ and $OPT_2$ from the frequency comb COMB_OUT. The optical signals $OPT_1$ and $OPT_2$ are then amplified by optical amplifiers 112.

The amplified optical signals $OPT_1$ and $OPT_2$ are each provided to an electro-optical modulator (EOM) 114 via a set of mirrors 116. The EOMs 114 are configured to phase-modulate the respective optical signals $OPT_1$ and $OPT_2$. The modulated optical signals $OPT_1$ and $OPT_2$ are then provided to respective polarizing beam-splitters 118 that are configured to linearly polarize the optical signals $OPT_1$ and $OPT_2$ by passing a first linear polarization state and reflecting a second linear polarization state. Thus, the linearly polarized optical signals $OPT_1$ and $OPT_2$ are each provided to respective quarter-wave plates 120 and 122. In the example of FIG. 3, the quarter-wave plate 120 can have a thickness of approximately $\lambda_1/4$ and the quarter-wave plate 122 can have a thickness of approximately $\lambda_2/4$, such that the quarter-wave plates 120 and 122 are configured to circularly polarize the optical signals $OPT_1$ and $OPT_2$ in the propagation direction toward the optical cavity 106. Thus, the optical cavity 106 receives the circularly polarized optical signals $OPT_1$ and $OPT_2$ at opposing ends and rejects light having wavelengths other than the wavelengths $\lambda_1$ and $\lambda_2$ of the optical signals $OPT_1$ and $OPT_2$. Accordingly, the optical signals $OPT_1$ and $OPT_2$ resonate within the optical cavity 106.

The portions of the optical signals $OPT_1$ and $OPT_2$ are output from optical cavity 106 in the optical path from which they entered the optical cavity. Thus, the first optical signal $OPT_1$ reverse propagates back to the quarter-wave plate 120 to be converted back to a linear polarization state and is reflected from the respective polarizing beam-splitter 118. Similarly, the second optical signal $OPT_2$ reverse propagates back to the quarter-wave plate 122 to be converted back to a linear polarization state and is reflected from the respective polarizing beam-splitter 118. Thus, the optical signals $OPT_1$ and $OPT_2$ are provided to a set of feedback stabilization components 124.

The feedback stabilization components 124 include detectors 126 that are configured to receive the respective optical signals $OPT_1$ and $OPT_2$ and to detect an amount that the optical signals $OPT_1$ and $OPT_2$ are off-resonance with the optical cavity 106. As an example, each of the detectors 126 can each include a combination of photodetecting, mixing, and filtering components that collectively generate respective electronic signals $DET_1$ and $DET_2$. The electronic signals $DET_1$ and $DET_2$ can thus provide an indication of the amount that the optical signals $OPT_1$ and $OPT_2$ are off-resonance with the optical cavity 106. The signals $DET_1$ and $DET_2$ are each provided to a respective set of servo amplifiers 128 that are configured to generate respective signals $FB_1$ and $FB_2$. The signals $FB_1$ and $FB_2$ are provided to the laser 102 to tune the laser 102, such that the respective frequency components of the frequency comb COMB_OUT generated by the laser 102 that correspond to the first and second optical signals $OPT_1$ and $OPT_2$ are adjusted.

Therefore, the configuration of the optical frequency stabilization system 100 allows the frequencies associated with both the first and second optical signals $OPT_1$ and $OPT_2$ to be stabilized in a controlled feedback manner by implementing a single optical cavity 106. As a result, significant cost savings and design simplicity can be achieved based on the omission of additional non-linear optics components and additional optical cavities corresponding to each frequency to be stabilized over one. In addition, because the frequency of both of the optical signals $OPT_1$ and $OPT_2$ are stabilized based on the single optical cavity 106, the optical frequency stabilization system 100 can exhibit improved performance over typical optical frequency stabilization systems. Specifically, typical optical frequency stabilization systems that employ additional optical cavities can exhibit possible differences in structural tolerances associated with the separate optical cavities that could result in inaccuracies in one optical signal relative to the other. Thus, by stabilizing the two frequencies of the respective optical signals $OPT_1$ and $OPT_2$ from a common optical cavity 106, such inaccuracies due to structural tolerance deviations between optical cavities are eliminated.

The optical frequency stabilization system 100 is not intended to be limited to the example of FIG. 3. As an example, the arrangement of the optics 104 can vary greatly in the manner in which the optical signals $OPT_1$ and $OPT_2$ are separated from the frequency comb COMB_OUT and directed into the optical cavity 106, and is thus demonstrated in the example of FIG. 3 as one example. As another example, similar to as described above regarding FIG. 1, the optical cavity 106 can be configured in a variety of different ways, and is thus not limited to a Fabry-Pérot optical cavity.

As another example, the arrangement of the optical cavity 106 can provide additional utility with respect to the optical signals $OPT_1$ and $OPT_2$. FIG. 4 illustrates an example of a diagram 150 of a portion of the optical frequency stabilization system 100 in accordance with an aspect of the invention. The portion of the optical frequency stabilization system 100 includes the optical cavity 106 and the quarter-wave plates 120 and 122. However, in the example of FIG. 4, the optical frequency stabilization system 100 further includes a first dichroic beam-splitter 152 in an optical path between the first quarter-wave plate 120 and the optical cavity 106 and a second dichroic beam-splitter 154 in an optical path between the second quarter-wave plate 122 and the optical cavity 106. The first dichroic beam-splitter 152 is configured to pass the first optical signal $OPT_1$ output from the optical cavity 106 and to reflect the second optical signal $OPT_2$ output from the optical cavity 106. Similarly, the second dichroic beam-splitter 154 is configured to pass the second optical signal $OPT_2$ output from the optical cavity 106 and to reflect the first optical signal $OPT_1$ output from the optical cavity 106. Therefore, the first and second optical signals $OPT_1$ and $OPT_2$ can be output from the optical frequency stabilization system 100 as single frequency signals that are stable frequency sources independent of the frequency comb COMB_OUT. The first and second optical signals $OPT_1$ and $OPT_2$ can thus be implemented for any of a variety of reasons, such as may require a single stable frequency source.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for stabilizing a first optical signal and a second optical signal in accordance with an aspect of the invention. At 202, a frequency comb comprising a first wavelength associated with the first frequency and a second wavelength associated with the second frequency is generated, the first and second wavelengths being distinct. The frequency comb can be generated by a laser, such as a mode-locked laser. At 204, the frequency comb is separated into a first optical signal having the first wavelength and a second optical signal having the second wavelength. The separation of the first and second optical signals can be based on a set of optics. At 206, the first and second optical signals are provided into respective first and second inputs of an optical cavity. The optics can provide the first and second optical signals into the optical cavity, such as based on modulation, beam-splitting, and polarization techniques.

At 208, the first and second optical signals are resonated within the optical cavity. The optical cavity can have reflectors, such as at opposing ends, that include alternative layers that include different refractive index coating materials and that each have an optical thickness that is approximately one-quarter of a design wavelength λ associated with the optical cavity 106. The thickness can also be an odd multiple of one quarter of the design wavelength λ. At 210, the first and second optical signals are received from the optical cavity. The optical signals can be output from the optical cavity and reflected from a polarizing beam-splitter. At 212, respective first and second feedback signals are generated based on the first and second optical signals to stabilize the first and second frequencies. The feedback signals can be based on detected off-resonance of the first and second optical signals with respect to the optical cavity, and can thus be generated by servo amplifiers to tune the laser.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An optical system comprising:
    an optical cavity comprising a plurality of reflectors; and
    optics configured to provide a first optical signal and a second optical signal into a first input and a second input, respectively, of the optical cavity to be substantially concurrently resonated within the optical cavity, the first and second optical signals having distinct wavelengths, wherein the first input comprises a first end of the optical cavity and the second input comprises a second end of the optical cavity that is substantially opposite the first end.

2. The system of claim 1, wherein the plurality of reflectors comprise at least one first layer that alternates with at least one second layer, the at least one first and second layers having different indices of refraction with respect to each other and having an optical thickness that is approximately equal to an odd multiple of one quarter of a design wavelength, where the odd multiple is a positive integer.

3. The system of claim 2, wherein the odd multiple is greater than one.

4. The system of claim 1, wherein the first optical signal has a first wavelength that is approximately equal to one of the design wavelength and a wavelength corresponding to a first odd harmonic frequency with respect to the design wavelength and wherein the second optical signal has a second wavelength that is approximately equal to a wavelength corresponding to a second odd harmonic frequency with respect to the design wavelength, the first and second wavelengths being distinct.

5. The optical cavity of claim 4, wherein the first wavelength and the second wavelength are associated with a first frequency and a second frequency, respectively, that occupy a frequency band spanning less than one octave.

6. An optical frequency stabilization system comprising the optical system of claim 1, the system further comprising:
    a laser configured to generate a frequency comb comprising a first wavelength and a second wavelength, the optics being configured to separate the frequency comb into a first optical signal having the first wavelength and a second optical signal having the second wavelength and to provide the first and second optical signals into the optical cavity; and
    feedback stabilization components configured to receive the first and second optical signals output from the optical cavity and to provide respective feedback signals to the laser for substantially concurrently and independently stabilizing the first and second optical signals.

7. An optical frequency stabilization system comprising:
a laser configured to generate a frequency comb comprising a plurality of wavelengths;
optics configured to separate the frequency comb into a respective plurality of optical signals having the plurality of wavelengths;
an optical cavity configured to receive the plurality of optical signals from the optics and to resonate the plurality of optical signals within the optical cavity; and
feedback stabilization components configured to receive the plurality of optical signals output from the optical cavity and to provide a respective plurality of feedback signals to the laser for stabilizing frequencies associated with the plurality of wavelengths.

8. The system of claim 7, wherein optical cavity comprises a plurality of reflectors each comprising at least one first layer that alternates with at least one second layer, wherein each of the plurality of first and second layers have different indices of refraction with respect to each other and have an optical thickness that is approximately equal to an odd multiple of one quarter of a design wavelength, where the odd multiple is a positive integer.

9. The system of claim 8, wherein the odd multiple is greater than one.

10. The system of claim 8, wherein the plurality of optical signals comprises a first optical signal that is provided to a first end of the optical cavity and a second optical signal that is provided to a second end of the optical cavity for stabilization of a frequency of each of the first and second optical signals, wherein the first optical signal has a first wavelength that is approximately equal to one of the design wavelength and a wavelength corresponding to a first odd harmonic frequency with respect to the design wavelength and wherein the second optical signal has a second wavelength that is approximately equal to a wavelength corresponding to a second odd harmonic frequency with respect to the design wavelength, the first and second wavelengths being distinct.

11. The system of claim 10, further comprising a first beam-splitter arranged in a first beam path with the first end and configured to pass the first optical signal to be input into the first end and to reflect the second optical signal output from the first end to be provided as a first stable frequency source independent of the frequency comb.

12. The system of claim 11, further comprising a second beam-splitter arranged in a second beam path with the second end and configured to pass the second optical signal to be input into the second end and to reflect the first optical signal output from the second end to be provided as a second stable frequency source independent of the frequency comb.

13. The system of claim 7, wherein the plurality of optical signals comprises a first optical signal having a first wavelength and a second optical signal having a second wavelength, the first and second wavelengths being associated with a first frequency and a second frequency, respectively, that occupy a frequency band spanning less than one octave.

14. The system of claim 7, wherein the plurality of wavelengths associated with the plurality of optical signals that are resonant within the optical cavity have a ratio that that are odd integers with respect to each other.

15. A method for stabilizing a first frequency and a second frequency, the method comprising:
generating a frequency comb comprising a first wavelength associated with the first frequency and a second wavelength associated with the second frequency, the first and second wavelengths being distinct;
separating the frequency comb into a first optical signal having the first wavelength and a second optical signal having the second wavelength;
providing the first and second optical signals into respective first and second inputs of an optical cavity;
resonating the first and second optical signals within the optical cavity;
receiving the first and second optical signals from the optical cavity; and
generating respective first and second feedback signals based on the first and second optical signals to stabilize the first and second frequencies.

16. The method of claim 15, wherein resonating the first and second optical signals within the optical cavity comprises resonating the first and second optical signals in the optical cavity based on at least one first layer that alternates with at least one second layer, wherein each of the plurality of first and second layers have different indices of refraction with respect to each other and have an optical thickness that is approximately equal to an odd multiple of one quarter of a design wavelength, where the odd multiple is a positive integer.

17. The method of claim 16, wherein the first wavelength is approximately equal to one of the design wavelength and a wavelength corresponding to a first odd harmonic frequency with respect to the design wavelength and wherein the second wavelength is approximately equal to a wavelength corresponding to a second odd harmonic frequency with respect to the design wavelength.

18. The method of claim 16, wherein the first and second wavelengths are associated with a first frequency and a second frequency, respectively, that occupy a frequency band spanning less than one octave.

19. The method of claim 15, further comprising reflecting the second optical signal from an optical path that includes a first end of the optical cavity to be provided as a first stable frequency source independent of the frequency comb.

20. The method of claim 19, further comprising reflecting the first optical signal from an optical path that includes the second end of the optical cavity to be provided as a second stable frequency source independent of the frequency comb.

21. The system of claim 7, wherein the feedback stabilization components are configured to provide the respective plurality of feedback signals to the laser for substantially concurrently and independently stabilizing the frequencies associated with the plurality of wavelengths.

22. The method of claim 15, wherein generating the respective first and second feedback signals comprises generating the respective first and second feedback signals based on the first and second optical signals to substantially concurrently and independently stabilize the first and second frequencies.

\* \* \* \* \*